United States Patent Office 2,922,770
Patented Jan. 26, 1960

2,922,770

VINYLIDENE POLYMER COMPOSITION CONTAINING AMMONIUM SALT OF A TOTALLY HYDROXYALKYLATED AMINE

Myron A. Coler, Scarsdale, and Arnold S. Louis, Riverdale, N.Y.

No Drawing. Application March 30, 1956
Serial No. 574,948

13 Claims. (Cl. 260—30.6)

This invention relates to improved synthetic resin molding compositions and methods of making same and, in particular, to such molding materials which avoid the highly undesirable effects of electrostatic charge build-up during the molding operation.

This application is a continuation-in-part of our co-pending application, Serial Number 556,397, filed on December 30, 1955, entitled "Non-Electrostatic Molding Compositions" and assigned to the assignee of this application and abandoned in favor of the present application.

It has been found that the process of molding certain synthetic resins causes the generation of high electrostatic charges. This evidences itself frequently by the formation of "crow's-feet," "fern-like" and "zig-zag" patterns through the attraction of fine dust particles from the atmosphere. Such patterns are sometimes erroneously interpreted as being molding flaws.

The literature discloses many additives, for rendering synthetic resins destaticized. Many of such additives depend on the property of deliquescence to cause the article to be wetted by moisture from the air. The moisture renders the surfaces of the article sufficiently conductive to prevent the further accumulation of electrostatic charges. Molding operations are normally carried out at temperatures substantially in excess of the boiling point of water and, therefore, as molded, the molded article is moisture free and thus subject to the accumulation of electrostatic charges at the time of molding.

Still other additions, which are inherently destaticizing agents, tend to undesirable affect the physical properties of the plastic. For example, a lowering of the heat distortion point may occur, there may also be a change in color, gloss, hardness, or water absorption characteristics, or blemishes may result from decomposition of additives or evaporation of low boiling fractions. The resulting product may also become toxic if the additive is in itself toxic.

Our invention, disclosed hereinafter, provides a plastic composition which avoids the disadvantages of acquiring electrostatic charges and in particular, which is not susceptible to electrostatic charging during the molding operation or upon release from the mold.

This invention does not depend on deliquescent action and, therefore, produces results substantially independent of humidity. This advantage of this invention is important in the elimination of the tendency for dust patterns to form on freshly molded plastic articles.

We have found that the acid salts resulting from the reaction of one molecule of totally hydroxyalkylated alkylene diamines with one or two equivalents of an acid may be incorporated into synthetic resin molding compositions to produce anti-static molding compositions. The alkylene radical should contain 2 to 6 carbon atoms while the hydroxyalkyl radical should contain 2 to 8 carbon atoms. The preferred starting materials are the totally hydroxy-propylated alkylene diamines.

The totally hydroxyalkylated alkylene diammonium salts used are represented by the following chemical structure:

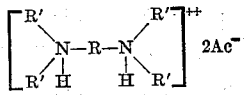

wherein: R is an alkylene radical containing from 2 to 6 carbon atoms and R' is an hydroxyalkyl group containing from 2 to 8 carbon atoms and Ac represents a monovalent acid anion. In a given compound the several hydroxyalkyl groups represented by the symbol R' may be different.

The formula shown represents the product of reacting two equivalents of an acid with one mol of hydroxyalkylated alkylene diamine. If only one equivalent of acid had been used, then but one hydrogen atom would have been attached directly to a nitrogen atom in the anion and that ion would have been monovalent.

Selected totally hydroxyalkylated alkylene diamines particularly suitable for the purposes of the invention include totally hydroxypropylated and totally hydroxyethylated ethylene, propylene, butylene, trimethylene and hexamethylene diamines.

Typical among acids suitable for reaction with the specified totally hydroxyalkylated alkylene diamines are acetic, phosphoric, sulfuric and butyric acids. This list is not intended to be limiting.

The formation of acid salts is a standard procedure and therefore, need not be described herein.

It has been discovered in the course of experimentation with materials of the type described above, that certain of the acid salts tend to cause puffing or the formation of blowholes during extrusion or molding. The situation is adequately covered if only those acid salts of totally hydroxyalkylated diamines having a vapor pressure less than 760 mm. at 225° C. are used. If more volatile compounds are used, gassing during extrusion or molding becomes objectionable.

While it would be objectionable to utilize materials having a vapor pressure below the specified limit as the primary additive, it may not be objectionable to use a minor proportion of such materials in combination with additives having the desired physical properties.

By incorporating any of the above mentioned additives in polystyrene or other resinous polymers, the destaticizing properties are attained without incurring any of the undesirable features enumerated above. The quantity of additive employed is between 1 and 7% by weight based on the total product and preferably between 2 and 6%. The upper limit is a matter of choice dictated by considerations of economy and is not critical. For example, 10% or more may be used and the desired destaticizing results obtained, although at higher concentrations there is danger of affecting physical properties adversely.

Be it observed that it will often be advantageous to prepare a master batch of resin with incorporated additive, said master batch containing far more additive than is recommended for use in molding operations and being later cut back by extrusion or by being otherwise blended with untreated resin. Such a concentrate may well be sold, particularly in the "clear" or "natural" color for blending with untreated resin of various colors or of its own color. The master batch may contain up to 50% of the additive.

A totally unexpected advantage of the above named additives was discovered during molding tests of material prepared in accordance with this invention. It was found that the additive improved flow properties of the base plastic so as to permit shorter molding cycles as well as improved filling of thin mold sections, reduced breakage of thin-walled moldings and easier mold release.

An object of this invention is therefore, to provide a method for eliminating the formation of electrostatic charges on molded plastic articles.

Another object is to provide a plastic molding composition having improved molding properties and methods of making same.

Still another object is to provide a plastic molding composition having preferred flow properties when injection molded.

A particular object is to provide a plastic material which is substantially non-susceptible to acquiring electrostatic charges.

A particular object of this invention is to provide a method for eliminating the formation of electrostatic charges on molded plastic articles during the molding operation.

Another object is to provide articles comprising polystyrene compositions which are free of the effects of electrostatic charges.

Still another object of this invention is to provide an improved plastic composition.

A still different object is to reduce the electrostatic charge on polystyrene objects made by injection molding.

A further object of this invention is to provide a polystyrene composition of superior molding properties.

Further objects and advantages will become apparent and still others will be pointed out with particularity as the following detailed description proceeds.

By way of illustration, there are given hereinafter a number of examples wherein the additive, quantity of additive and the resinous polymer employed are varied. Since hundreds of combinations are possible it becomes impractical to show more than a few typical compositions with additive so selected from the described group as to show operability of the group as a whole and therefore, such examples shall not be regarded as limiting in any sense.

Where it is desired to prepare a master batch or to market a concentrated blending material, the procedures of Examples 15 and 17 are preferred. In plants where mass polymerization is employed, the procedures of Examples 14 and 15 will be especially useful.

In cases where plastic chip is to be treated or where the polymerization methods in use are not adapted to taking advantage of the processes mentioned above, the process of Example 13 is preferred for its simplicity and freedom from extra drying steps.

Where it is desired to incorporate pigment in the plastic as well as to render it anti-static, the processes of Examples 1 and 2 are preferred. This procedure is claimed in our copending application entitled "Process for Making Plastic Compositions," Serial Number 532,-132, filed September 2, 1955.

In carrying out this last referred to process, the additive is dissolved in a solvent which is a non-solvent for the plastics employed. The solution and plastic in comminuted form are then mixed together. The solvent is then removed so as to deposit the additive over the plastic particles.

In accordance with a particular example of this last mentioned procedure from 0.1 to 0.7 pound of the additive is dissolved in 1 pound of isopropyl alcohol. Sufficient comminuted resinous polymer to make a total of 10 pounds of additive plus polymer is mixed with the solution. The alcohol is then evaporated in an exhaust oven at 65° C. for 36 hours with occasional agitation so as to leave the polymer granules uniformly coated with said additive.

The coated material is then fed through a Windsor Type RC–65 twinscrew extruder equipped with a series of ⅛" square orifices. The barrel and die are maintained at a suitable temperature for the particular polymer, such as 400° F. for polystyrene. The extruded material may then be chopped up into molding granules.

The molding granules may then be injection molded, as for example on a Reed-Prentice 8 ounce injection molding press. Typical conditions for polystyrene molding on the aforementioned machine is as follows:

Heater temperature __ 550° F.
Pressure _____ 700 p.s.i.
Cycle _____ 15 seconds injection, 15 seconds dwell, 10 seconds remove.
Die temperature _____ 155° F.

Conventional molding temperatures prescribed by the polymer supplied may be employed for other polymers.

As a test of the effectiveness of the additive, the resulting articles may be promptly sprayed with fine bentonite dust by means of a hand sprayer. The dust will collect in patterns on charged areas. Additional moldings may be set aside and observed periodically for several weeks. Using a Keithley electrostatic voltmeter, the potential may be measured between the molding and ground immediately after withdrawal from the mold.

As a control means identical articles may be molded from the same polymer not using the additive.

Example 1

The foregoing procedure was carried out using the following composition:

| | Lbs. |
|---|---|
| Totally hydroxypropylated ethylene diammonium diacetate | 0.3 |
| Polystyrene granules 10–60 mesh (Monsanto Chemical Corp. L2020 PIX–6) | 9.7 |

The dust test showed the absence of charged areas. The electrostatic voltmeter reading was about 1 volt.

One control article was sprayed with the bentonite dust immediately after molding and a well defined "fernlike" pattern was immediately apparent. The same control article yielded a 20 volt reading on the electrostatic voltmeter upon removal from the mold. After long term storage another unmodified polystyrene molding showed definite dust patterns whereas the modified polystyrene article showed but a few isolated, gravity-deposited grains.

The molding characteristics of the modified polystyrene were judged to be superior to that of the control or unmodified polystyrene by the molding machine operator on the basis of obviously improved ease of mold release and lower breakage of thin-walled moldings.

Example 2

The procedure of Example 1 was repeated with the exception that 0.1 gram of phthalocyanine blue was suspended in the alcohol and put through a colloid mill together with the additive prior to incorporation into the polystyrene. The resulting molded product was a uniform attractive pale blue color.

When tested as in Example 1, the molding and destaticizing characteristics were found to be identical to the treated product of Example 1.

Example 3

Example 1 was repeated with the same additive at a concentration of 1% by weight of the total product. The resulting molding exhibited poor non-electrostatic properties, as measured by the Keithley voltmeter. A small amount of dust was collected in patterns after storage for two weeks.

Example 4

Example 1 was repeated using 0.6 lb. of the same additive and 9.4 lbs. of polystyrene and a slight improvement in destaticizing properties was noted.

Example 5

The procedure of Example 1 was repeated with 0.6 lb. of the same additive and 9.4 lbs. of polymethylmethacrylate. Extrusion was carried out with a barrel and die temperature of 375° F. Injection molding was performed with a heater temperature of 390° F. and a die at room temperature.

The resultant molding had substantially the same hardness as an unmodified control molding and exhibited excellent nonstatic and molding properties. The Keithley voltmeter reading was 0.6 volt directly after the molding operation.

Example 6

Procedure of Example 1 was repeated with an extruder barrel and die temperature of 350° F. utilizing 9.4 lbs. of ⅛" polyethylene pellets as the resinous polymer and 0.6 lb. of totally hydroxypropylated butylene diammonium bisulfate. Molding was carried out at a temperature of 350° F. in the heater. The resultant molding had substantially the same hardness as an unmodified control molding and exhibited excellent non-static and molding properties. The Keithley voltmeter reading was approximately 1 volt directly after the molding operation. The polyethylene control specimen produced a 19 volt reading on the same meter, directly after molding.

Example 7

The procedure of Example 1 was repeated using 0.6 lb. of additive, 9.4 lbs. of polyvinylchloride and an extruder barrel and die temperature of 390° F. Molding was performed with a heater temperature of 400° F. The resulting molded articles were similar in appearance to unmodified polyvinylchloride and exhibited excellent molding and anti-static properties. The electrostatic voltmeter test yielded a reading of about 2 volts whereas untreated polyvinylchloride showed a reading of 20 volts upon molding.

Example 8

The procedure of Example 1 was repeated using a so-called high impact polystyrene which is a plastic alloy of 85% polystyrene 5% polyacrylonitrile and 10% polybutadiene. The molded product was compared with a control specimen prepared in identical fashion with the exception that the additive was omitted. The two specimens were opaque in appearance. Immediately after molding the treated material showed a charge of 1 volt whereas the unmodified control showed a charge of 18 volts.

Example 9

Example 1 was repeated using the acid salt resulting from the reaction of totally hydroxypropylated butylene diamine and one equivalent of butyric acid. The results were substantially identical.

Example 10

Example 6 was repeated using the acid salt resulting from reacting one equivalent of phosphoric acid with totally hydroxyethylated trimethylene diamine. The results were comparable.

Example 11

Example 8 was repeated using the acid salt resulting from the reaction of one equivalent of stearic acid with totally hydroxypropylated hexamethylene diamine. The results were comparable.

Example 12

2.0 pounds of isopropyl alcohol and 0.3 pound of totally hydroxyethylated propylene diammonium phosphate were mixed together to form a solution of water consistency. The foregoing mixture was worked in a sigma blade mixer with 9.7 pounds of the same polystyrene as employed in Example 1. After 10 minutes, the particles were found to be coated with the additive. The coated particles were then dried at 65° C. for 24 hours to remove the alcohol. The coated particles were then put through the extruder, chopped and molded as in Example 1. The resulting products showed the same properties as the modified compositions of Example 1.

Example 13

0.6 pound of totally hydroxypropylated propylene diacetate and 9.4 pounds of the polystyrene were thoroughly mixed in a sigma blade mixer. The mixture was then extruded, chopped and molded as in Example 1. The molded articles showed no discernible electrostatic charge as measured on the Keithley meter. The molded articles showed no tendency to collect dust in patterns during the storage test.

Example 14

2.4 grams of α, α′ azodiisobutyronitrile was dissolved in 960 grams of monomeric styrene along with 40 grams of totally hydroxypropylated ethylene diammonium acetate. The solution was placed in a heated agitated reaction kettle into which nitrogen was bubbled. The styrene solution was heated at 70° C. for 1½ hours until an exothermic reaction took place. The reaction was continued for an additional 30 minutes with the temperature being gradually increased to 90° C. until considerable polymerization took place as evidenced by an increase in viscosity. The mixture was transferred to air-free containers which were then sealed. The containers were maintained at a temperature of 90° C. for 48 hours. The resultant polymer was injection molded under normal polystyrene molding conditions. Moldings were clean and appeared equivalent to conventional polystyrene, except that when rubbed with a wool cloth they would not become electrostatically charged as does unmodified polystyrene when so rubbed.

Example 15

2.0 grams of α,α′azodiisobutyronitrile was dissolved in 800 grams of monomeric styrene, 200 grams of totally hydroxypropylated ethylene diammonium diacetate dissolved in the styrene and the solution was placed in a heated reaction kettle into which nitrogen was bubbled. The solution was heated at 70° C. for 1½ hours until an exothermic reaction took place. The reaction was continued for an additional 30 minutes during which the temperature was gradually increased to 90° C. Considerable polymerization took place as evidenced by an increase in viscosity. The mixture was transferred to air-free containers which were then sealed. The containers were maintained at a temperature of 90° C. for 48 hours. The resultant polymer was extruded and chopped into granules. Later 300 grams of the granules were mixed with 700 grams of untreated polystyrene molding compounds and extruded, chopped and injection molded under normal conditions for polystyrene. The quality of the resulting moldings was in all respects equal to that of the moldings of Example 1.

Example 16

40 grams of totally hydroxypropylated ethylene diammonium phosphate dissolved in 40 grams of water, was incorporated into 666 grams of polystyrene emulsion containing 30% polystyrene solids.

760 grams of granulated polystyrene was placed in a Baker-Perkins mixer. With the mixer in operation, the polystyrene emulsion-diamine mixture was slowly added. The resultant slurry was then dried at 65° C. for 48 hours at which time it was found to be water free. The resultant mixture which contained 4% of the diamine, when molded as in Example 1, yielded translucent moldings which when tested as in Example 1, the moldings exhibited destaticized characteristics similar to the modified properties of the product of Example 1.

Example 17

40 grams of totally hydroxyoctylated hexamethylene diammonium bisulfate dissolved in 40 grams of water, was added to 400 grams of a 30% solids polystyrene emulsion. This mixture was spray-dried and gave a free flowing polystyrene powder containing one part of the diamine to three parts of polystyrene. The resultant concentrate was tumbled with 840 grams of a granulated polystyrene. The resultant blend was injection molded under conventional polystyrene molding conditions and yielded destaticized moldings.

For the purpose of illustrating the invention, examples have been shown of the application of our invention to plastic alloys of polystyrene, polyethylene, polyvinyl chloride and polymethylmethacrylate and their copolymers. We wish it to be understood that the invention likewise may be utilized in treating other polymers such as polyacrylonitrile, polyfluoroethylene, polytrifluoromonochloroethylene, polybutadienes, halogenated polystyrenes and mixtures and copolymers of these materials.

The term "vinylidene" as used herein is intended to define monomers containing a polymerizable unsaturated $CH_2=C<$ structure and is generic to vinyl and vinylidene monomers. Each of the polymers specifically exemplified in the preceding examples, namely: polystyrene, polymethylmethacrylate, polyvinyl chloride and polyethylene is a polymer of a vinylidene monomer, so defined.

By "plastic alloy" as used herein, we intend to encompass compositions comprising two or more types of polymeric molecules whether prepared by copolymerization or by intimate mixing.

It is to be understood that various combinations of the acid salts may be employed to provide the specified percentages of the additives.

While we have disclosed what is at present considered the best mode for carrying out our invention we appreciate that it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A composition of matter comprising a polymer of a vinylidene monomer and containing a destaticizing additive consisting of from 1% to 50% by weight, based on the weight of the polymer, of an ammonium salt produced by reacting (1) a totally hydroxyalkylated amine of the formula

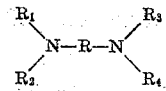

in which R is an alkylene radical containing from 2 to 6 carbon atoms and $R_1$, $R_2$, $R_3$, and $R_4$ are hydroxyalkyl radicals with from 2 to 8 carbon atoms with (2) and acid, the proportion of acid to diamine being such that a hydrogen attaches to at least one and not more than both nitrogen atoms of the diamine; and the resulting compound having a vapor pressure of less than 760 mm. at 225° C.

2. The composition of claim 1 wherein the additive consists of between 2% and 6% by weight based on the weight of the polymer.

3. The composition of claim 1 wherein the polymer is polyethylene.

4. The composition of claim 1 wherein the polymer is polymethylmethacrylate.

5. The composition of claim 1 wherein the polymer is polystyrene.

6. The composition of claim 1 wherein the polymer is polyvinylchloride.

7. The composition of claim 1 wherein the diamine is a totally hydroxypropylated alkylene diamine.

8. The composition of claim 1 wherein the diamine is a totally hydroxypropylated ethylene diamine.

9. The composition of claim 1 wherein the diamine is a totally hydroxypropylated trimethylene diamine.

10. The composition of claim 1 wherein the diamine is a totally hydroxypropylated hexamethylene diamine.

11. The composition of claim 1 wherein the diamine is a totally hydroxypropylated propylene diamine.

12. The composition of claim 1 wherein the diamine is a totally hydroxypropylated butylene diamine.

13. The composition of claim 1 wherein the acid is selected from the group consisting of phosphoric, acetic, sulfuric, butyric, stearic and halogen acids.

References Cited in the file of this patent

UNITED STATES PATENTS

| | | |
|---|---|---|
| 2,271,468 | Watkins | Jan. 27, 1942 |
| 2,403,960 | Stoops et al. | July 16, 1946 |
| 2,697,118 | Lundsted et al. | Dec. 14, 1954 |

UNITED STATES PATENT OFFICE
CERTIFICATE OF CORRECTION

Patent No. 2,922,770                        January 26, 1960

Myron A. Coler et al.

It is hereby certified that error appears in the printed specification of the above numbered patent requiring correction and that the said Letters Patent should read as corrected below.

Column 4, line 11, for "supplied" read -- supplier --; column 7, line 1, for "grave" read -- gave --; column 8, line 7, for "and acid" read -- an acid --.

Signed and sealed this 16th day of August 1960.

(SEAL)
Attest:

KARL H. AXLINE                            ROBERT C. WATSON
Attesting Officer                         Commissioner of Patents